United States Patent
McCann et al.

(10) Patent No.: US 6,293,370 B1
(45) Date of Patent: Sep. 25, 2001

(54) VEHICLE BRAKE HAVING ELECTRIC MOTOR CONTROL OF BRAKE RUNNING CLEARANCE

(75) Inventors: Denis John McCann, Llangynidr; Andrew John Ward, Abergavenny, both of (GB)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/425,818

(22) Filed: Oct. 22, 1999

(30) Foreign Application Priority Data

Oct. 24, 1998 (GB) .................................................. 9823198

(51) Int. Cl.$^7$ ............................ B60T 13/74; F16D 65/56; F16D 66/00

(52) U.S. Cl. ..................................... 188/71.8; 188/1.11 L; 188/1.11 W; 188/1.11 E; 188/72.1; 188/158; 188/162; 303/20

(58) Field of Search ................................... 188/72.1, 156, 188/158, 161, 163, 71.1, 196 R, 79.51, 1.11 E, 71.8, 71.9, 1.11 R, 181 T, 162, 1.11 L, 1.11 W; 303/3, 20, 115.2, 113.2, 112; 701/72, 70; 318/430–433, 13, 362, 139, 370; 310/77, 88; 340/454

(56) References Cited

U.S. PATENT DOCUMENTS

| | | |
|---|---|---|
| 2,235,412 | 3/1941 | Weiss . |
| 3,684,049 | 8/1972 | Kimura . |
| 3,887,040 | 6/1975 | Simon . |
| 4,175,646 | 11/1979 | Eikelberger . |
| 4,400,039 | 8/1983 | Ogata . |
| 4,677,420 | 6/1987 | Topic . |
| 4,685,540 | 8/1987 | Rath . |
| 4,804,073 | 2/1989 | Taig . |
| 4,809,824 | 3/1989 | Fargier . |
| 4,850,459 | * 7/1989 | Johannesen et al. . |
| 4,995,483 | * 2/1991 | Moseley et al. . |
| 5,050,938 | 9/1991 | Brearley . |
| 5,127,495 | 7/1992 | Verner . |
| 5,148,894 | 9/1992 | Eddy . |
| 5,158,160 | * 10/1992 | Doell ................................ 188/79.51 |
| 5,161,650 | 11/1992 | Taig . |
| 5,310,251 | 5/1994 | Towers . |
| 5,348,123 | 9/1994 | Takahashi . |
| 5,370,449 | 12/1994 | Edelen . |
| 5,410,293 | 4/1995 | Angerfors . |
| 5,775,448 | 7/1998 | Hirahara . |
| 5,788,023 | * 8/1998 | Schoner et al. ....................... 188/158 |
| 5,807,205 | 9/1998 | Odoaka . |
| 5,848,672 | * 12/1998 | Brearley et al. ................. 188/1.11 L |
| 5,949,168 | * 9/1999 | Dieckmann et al. . |
| 5,954,162 | 9/1999 | Feigel . |
| 5,957,246 | * 9/1999 | Suzuki ............................ 188/1.11 L |
| 5,975,250 | 11/1999 | Brandmeier . |
| 5,988,773 | 11/1999 | Sawada . |
| 6,000,507 | * 12/1999 | Böhm et al. ..................... 188/1.11 E |
| 6,003,640 | * 12/1999 | Ralea .............................. 188/1.11 L |
| 6,012,556 | * 1/2000 | Blosch et al. ....................... 188/21.8 |
| 6,016,694 | 1/2000 | Decker . |
| 6,129,183 | * 10/2000 | Ward .............................. 188/1.11 W |
| 6,139,117 | 10/2000 | Shirai . |

FOREIGN PATENT DOCUMENTS

| | | |
|---|---|---|
| 4327759 C2 | 7/1996 | (DE) . |
| 19620344 | 8/1997 | (DE) . |
| 19705105 A1 | 8/1997 | (DE) . |

(List continued on next page.)

*Primary Examiner*—Douglas C. Butler
(74) *Attorney, Agent, or Firm*—Carlson, Gaskey & Olds (57) ABSTRACT

A vehicle braking system adapted to apply a brake lining to a brake rotor, and having a clearance control device for maintaining the free running clearance between the brake lining and the brake rotor during the non-braking phase, comprising an electric motor (40) for adjustment of the brake lining position relative to the brake rotor, with the adjustment being arranged to take place only during the brakes-off condition.

18 Claims, 9 Drawing Sheets

FOREIGN PATENT DOCUMENTS

| | | |
|---|---|---|
| 19653541 A1 | 6/1998 | (DE) . |
| 19738877 A1 | 9/1998 | (DE) . |
| 789156 * | 8/1997 | (EP) . |
| 0995657 A2 | 10/1999 | (EP) . |
| 0995659 A1 | 10/1999 | (EP) . |
| 0995922 A2 | 10/1999 | (EP) . |
| 995923 * | 4/2000 | (EP) . |
| 359086723 A | 5/1984 | (JP) . |
| 59145659 A | 8/1984 | (JP) . |
| 4108058 | 4/1992 | (JP) . |
| 8-127317 | 10/1994 | (JP) . |
| 7257356 | 10/1995 | (JP) . |
| 7277157 | 10/1995 | (JP) . |
| 9221010 | 8/1997 | (JP) . |
| 100024813 | 1/1998 | (JP) . |
| 9729297 * | 8/1997 | (WO) . |
| 9729298 * | 8/1997 | (WO) . |
| WO 97/29292 | 8/1997 | (WO) . |
| WO 99/38738 | 8/1999 | (WO) . |
| WO 99/48738 | 9/1999 | (WO) . |

* cited by examiner

OPTION B :- 'V' SHAPED OP-SHAFT

ORIGINAL      MODIFIED

VEHICLE BRAKE HAVING ELECTRIC MOTOR CONTROL OF BRAKE RUNNING CLEARANCE

The present invention is concerned with the provision and operation of an electric motor within a brake to control the brake running clearance and to enable brake de-adjustment.

It is already well known to provide an electric motor to control the running clearance of braking linings relative to a brake motor based upon signals from sensors monitoring the clearance take-up movement and brake actuation stroke. The known systems tend to mimic the mechanical operation of a conventional brake clearance control device known as an "automatic adjuster". In such adjusters, a clutch having some degree of lost motion is provided where the level of free motion is equivalent to the maximum allowable running clearance. Should the brake linings wear such that the running clearance is greater than this maximum allowable clearance, upon operation of the brake, the free running clearance is "taken-up" and the further additional movement, caused by the excess lining clearance causes the clutch to slip. The slipping motion has the effect of moving the backstop or datum position for the return of the brake lining, thus progressively advancing the lining towards the brake rotor as the brake lining wears. Such mechanical automatic adjusters are well known in the art.

In a brake of the kind envisaged by the present invention, it is important to reduce weight, power consumption (whether electrical or pneumatic) and material costs. Unfortunately, in a conventional brake, having an automatic adjuster of the mechanical kind or even an electric adjuster that mimics the mechanical operation, the strength of the mechanisms associated with the adjuster has to be extremely high. The reason for this is that the actual brake adjustment takes place only during the brakes-on phase of a brake application. The adjuster mechanism moves only when brake torque is being applied and therefore the adjuster drive train has to be capable of driving through this locked in torque.

It is an object of the present invention to provide an active brake adjustment mechanism that can overcome the disadvantages of the conventionally actuated adjuster.

In accordance with the present invention there is provided in a brake adapted to apply a brake lining to a brake rotor, a clearance control device for maintaining the free running clearance between the brake lining and the brake rotor during the non-braking phase, wherein the adjustment of the brake lining position relative to the brake rotor only takes place during the brakes-off condition.

The advantage of only adjusting the position of toe brake lining in the brakes-off condition is that the locked-in brake torque that has to be overcome before adjustment of the conventional kind can take place has now been eliminated.

Therefore in a brake in accordance with the present invention, the torque required to move the brake linings into the new datum position, when the brakes are not applied, is substantially reduced, and likewise, the torque being carried by the adjustment mechanism is also reduced.

With the reduction in torque required to perform the adjustment, it is now possible to redesign the adjuster drive train so that it is substantially smaller and lighter without compromising the performance of the adjustment mechanism.

In such a situation, it is now possible to design and implement an adjuster mechanism that is substantially formed from a light weight plastics material, which enables the overall weight of the brake assembly to be drastically reduced.

In accordance with another aspect of the present invention, the electric motor is housed substantially within the brake, thus protecting it and it's associated drive from any ingress of contaminants.

The invention is particularly applicable to brakes of the type wherein angular displacement of a rotary member, referred to commonly as the op-shaft, by an external actuator causes axial displacement of a pair of laterally spaced tappets, by way of rollers running on cam surfaces of the rotary member, the displacement of the tappets transmitting the actuator input load to a brake lining of the brake.

In a preferred embodiment of the present invention, the electric motor is located in the portion of the brake between the tappets, in a portion of the brake that conventionally was occupied by a mechanical adjuster. In such a position, the motor and it's drive are in close association with the mechanism for applying the brake.

In order to reduce the electric power consumption to a low level, the electric motor employed is preferably a high-speed low power/torque motor, operated in use in combination with a reduction gearbox.

Preferably, the reduction gearbox is of a compact design such as a compound epicyclical or multi-stage planetary gearbox. Alternative designs such as worm and wheel or cycloidal or any combination thereof are also suitable.

In order to provide the adjustment data required to perform the adjustment operation, a sensor or sensors must be provided to generate information about the movement of the brake. In particular, the free running stroke of the brake, i.e. the clearance take-up movement, needs to be assessed. The stroke of the brake actuator can be measured by a displacement sensor, but the portion of that travel that is equivalent to the free running travel can only be determined by assessment of the displacement in combination with knowing the load being applied. As the brake lining moves, under normal actuation, the load being applied during the free running or clearance take-up movement is low. As soon as the brake linings engage the brake rotor, the load required to move any distance further is substantially increased. It can therefore be seen that by comparison of brake lining displacement and applied load, the free running clearance of the brake lining with respect to the brake rotor can be determined.

Therefore, in a preferred brake of the kind according to the invention there is now provided a sensing means adapted to determine both the displacement of the brake and the load applied by the brake and a means to compare the output of the sensing means so as to determine the free running clearance of the brake.

The free running clearance of the brake can then be maintained within a desired range, through use of an electric drive within the brake adapted to adjust the datum position of the brake linings.

Preferably, a sensor within the brake provides brake lining position information that can be used to control the motor in positioning the brake linings correctly accordance with the prescribed limits.

Preferably, the sensor is also used to provide a signal that indicates the actual wear state of the brake linings and may take the form of an encoder, either linear or rotary, that is driven from a part of the brake that moves upon adjustment of the brake, said encoder signals being accumulated in a nonvolatile memory for use in an adjustment operation.

In a brake having an electric motor adapted to perform the adjustment operation, de-adjustment can also be enabled automatically through use of the same motor. De-adjustment is required when it has been determined that the brake linings require replacement. In a conventional brake, the adjuster mechanism has to be manually unwound so as to retract the brake-applying piston away from the brake rotor. This enables the old linings to be removed and replaced with new linings. In the implementation having an electric motor, a simple electrical signal from a brake-associated switch, either mounted on the brake or electrically connected thereto, can be used to instigate the retraction of the brake applying member.

The invention is described further hereinafter, by way of example only, with reference to the accompanying drawings, in which.

Figure 1:
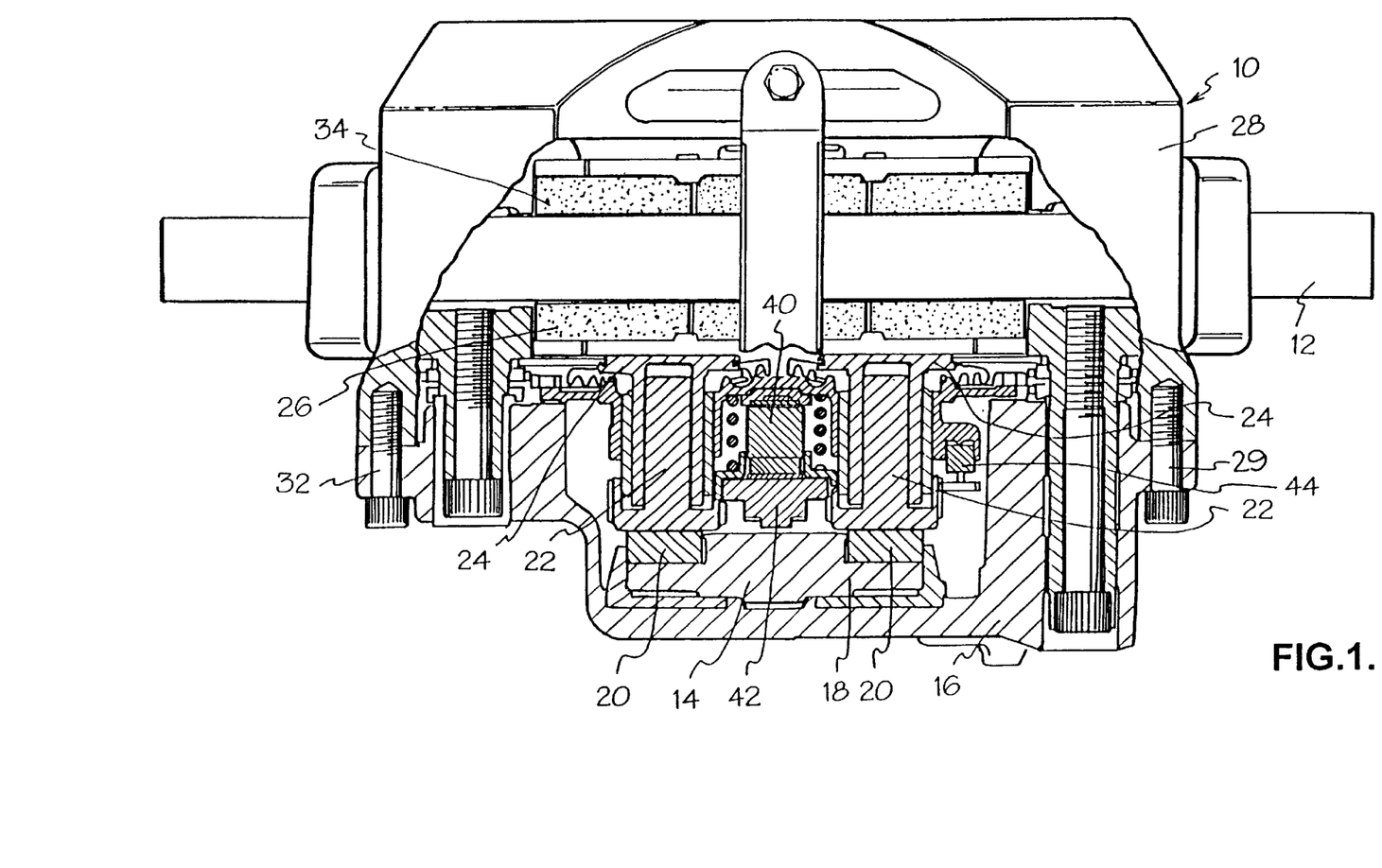
FIG. 1 is a partially sectioned plan view of one embodiment of a brake in accordance with the present invention.

The brake of FIG. 1 is of the type comprising a caliper housing 10 that straddles a disc 12 mounted on an axle of the vehicle to be braked (not shown). The brake is actuated by mechanical movement of an input actuator such as an air cylinder (not shown). Such actuators are well known in the field of brake actuation. The actuator co-operates with the outer end of the operating shaft or 'op-shaft' 14 of the brake. The inner end of the op-shaft 14 is carried in a bearing attached to the lower of inner housing part 16. Said inner end of the op-shaft 14 has formed on its outer surface a cam lobe 18 which, upon rotation, causes a reaction force to be transmitted to rollers 20. The rollers 20 in turn transmit the applied load to a pair of spaced inner tappet members 22. These inner tappet members 22 are screwed into engagement with associated outer tappet members 24 which apply the input load from the actuator to the rear of the inner braking lining 26, thus pressing the friction material of the inner braking lining 26 into frictional engagement with the disc 12. A reaction force is generated through this frictional engagement between the disc 12 and inner braking lining 26, that is fed back through the tappets 22 and 24, rollers 20 and cam lobe 18 which is supported by the inner housing part 16. The inner housing part 16 is secured to an outer housing part 28 by bridging bolts 29 and 32. Thus the applied force being generated by movement of the op-shaft 14 is ultimately transmitted by reaction means to the outer housing part 28 which in turn presses the outer brake lining 34 into frictional engagement with the disc 12. Therefore, the disc 12, upon movement of the op-shaft 14, is clamped between the inner and outer friction linings 26 and 34 to generate a braking force for braking the vehicle under control of the applied input movement.

Figure 7:
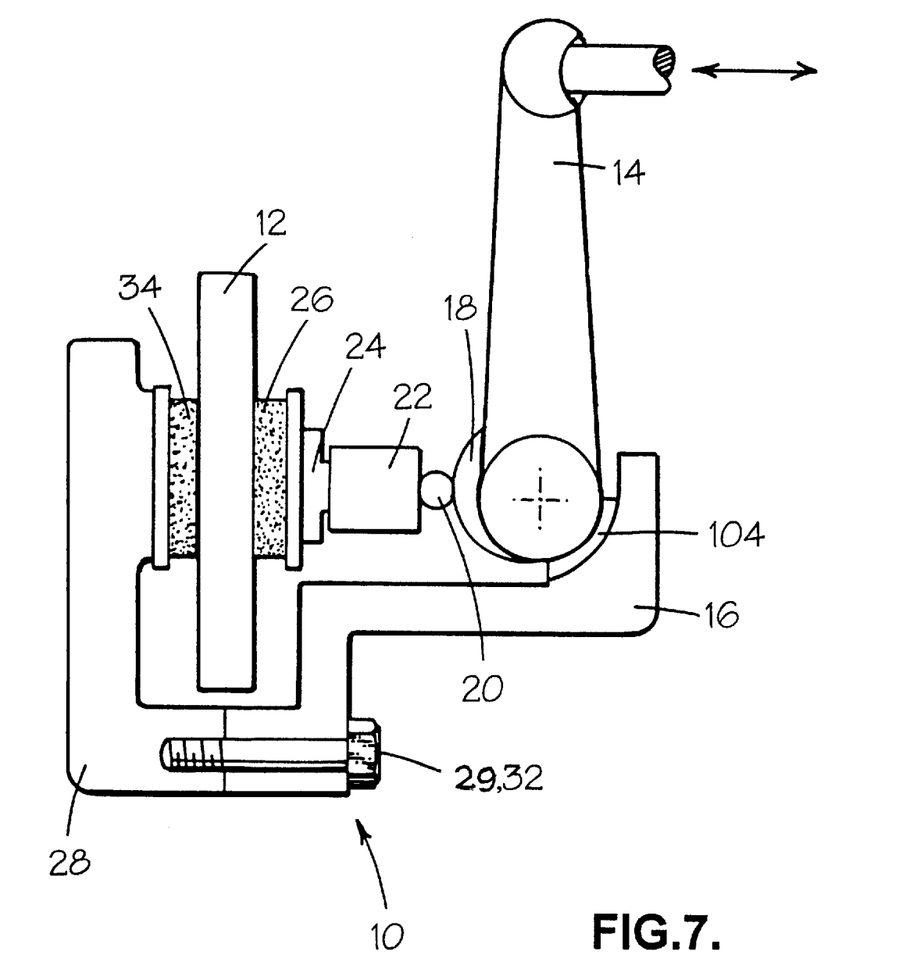
FIG. 7 illustrates the principle of operation of the brake of FIG. 1 via the operating shaft.

FIG. 7 is a simplified diagrammatic view illustrating the operation of the brake arrangement shown in FIG. 1.

As shown in FIG. 1, the brake also includes an electric motor 40 adapted to drive via a reduction gearbox 42, shown here by way of example as a multi-stage planetary gearbox, a part of the telescopic tappet assembly that, upon rotation, acts to increase or reduce the overall length of the tappet assembly in accordance with the direction of rotation of the motor. Such extension of contraction adjusts the rest position of the brake applying member and therefore the clearance available between the brake linings and the brake rotor disc.

Also shown is a rotary encoder 44 that is driven from a part of the tappet assembly that moves upon adjustment. The encoder produces a signal which is arranged to be processed in an ECU where it's output is accumulated to provide a measure of the total position and therefore total movement of the adjustment mechanism, this output being proportional to the actual wear condition of the brake linings.

Figure 2:
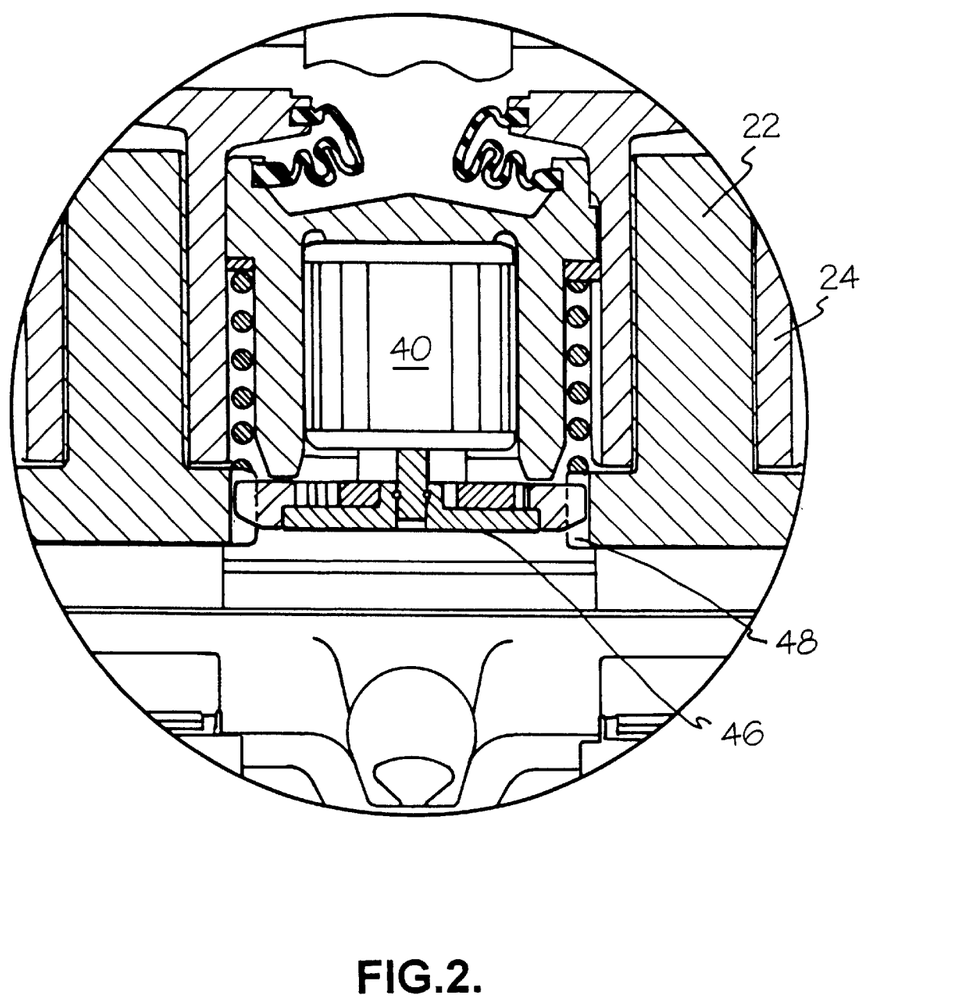
FIG. 2 is an enlarged detail of FIG. 1 showing a motor and gearbox installation.

In operation, once it has been determined that the brakes have been released, the clearance data obtained is used by the ECU to determine whether an adjustment of the clearance is required. If such an adjustment is required then the motor 40 is driven to the new position. As can be seen from FIG. 2, the motor output drives through a cycloid gearbox assembly 46 onto a gear form 48 associated with the inner tappet member 22. The inner tappet member 22 is threadedly engaged with the outer tappet member 24 which is held against rotation. Rotation of the inner tappet member causes the overall tappet assembly to either extend or contract. It should be appreciated that the torque required to drive the tappet assembly to produce the aforementioned effect is substantially lower when the tappet assembly is not under any substantial axial loading as the friction level is drastically reduced between the two threaded members. In view of the fact that the torque required to produce the adjustment movement is substantially small with respect to that had the brakes been applied, the gearbox and tappet drives can now be produced from a material that is substantially lighter.

Figure 3A:
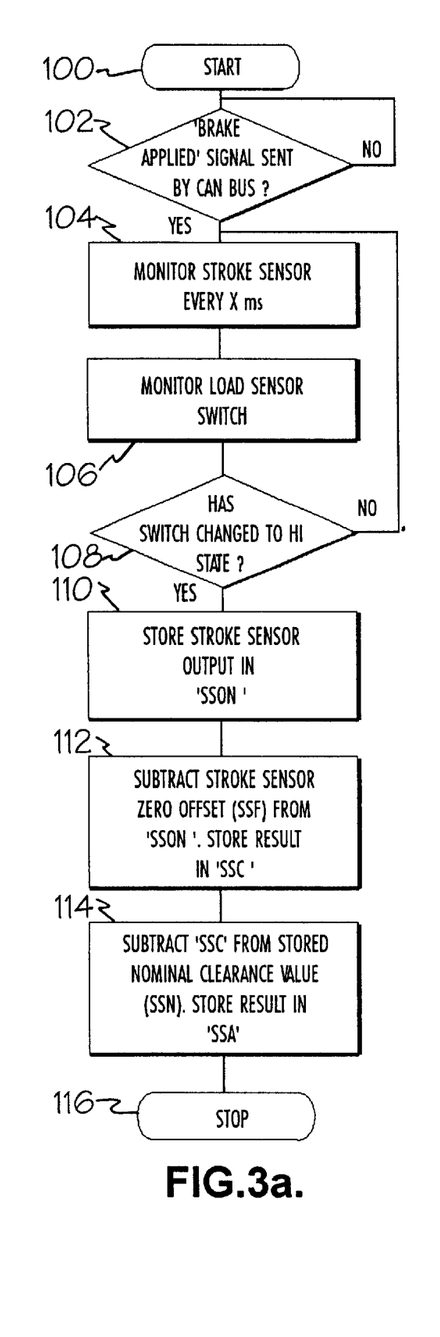
FIGS. 3a and 3b comprise flow charts showing how measurements are made.
Figure 3B:
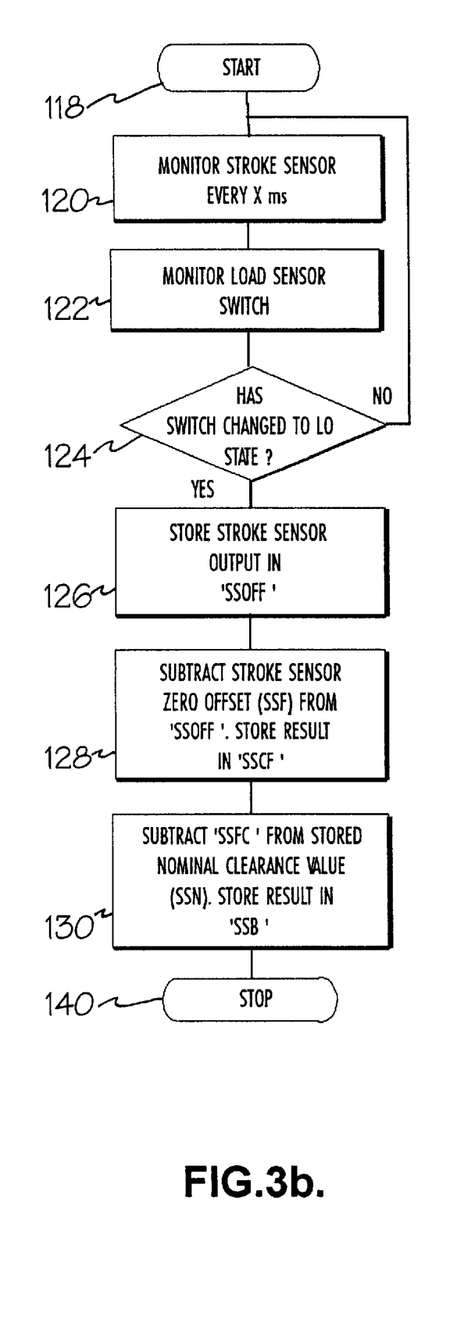

Reference is now made to the flowcharts of FIGS. 3a and 3b which show respectively examples of the sequence of steps during a brake application and brake release. The individual steps in FIGS. 3a and 3b are as follows:

100—Start
102—"Brake Applied" signal sent by CAN bus?
104—Monitor stroke sensor every X ms
106—Monitor load sensor switch
108—Has switch changed to HI state?
110—Store stroke sensor input in "SSON"
112—Subtract stroke sensor zero offset (SSF) from "SSOFF". Store result in "SSCF"
114—Subtract "SSCF" from stored nominal clearance value (SSN). Store result in "SSA"
116—Stop
118—Start
120—Monitor stroke sensor every X ms
122—Monitor load switch
124—Has switch changed to LO state?
126—Store stroke sensor output in "SSOFF"
128—Subtract stroke sensor zero offset (SSF) from "SSOFF". Store result in "SSCF"
130—Subtract "SSCF" from stored nominal clearance value (SSN). Store result in "SSB"
140—Stop.

In accordance with the flowchart of FIG. 3a, the brake application is monitored through sensing the stroke of the brake. Stroke can be measured, for example, using a linear displacement sensor coupled to the input end of the op-shaft 14. When the brake linings 26, 34 make fictional engagement with the brake rotor 12, the load transmitted by the brake actuator to the brake is sensed and detected. This can be achieved using a sensor disposed at the input end of the op-shaft 14, as illustrated by way of example in FIGS. 8 to 12 described hereinafter.

Figure 10:
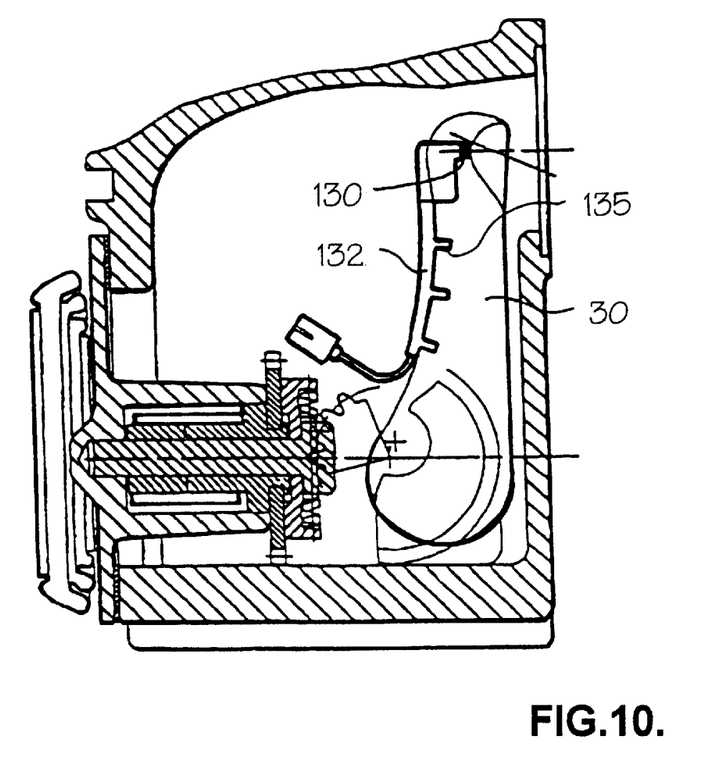
FIG. 10 is a sectional view showing the lever part of an operating shaft of a brake and associated wiring loom assembly.

Referring first to FIG. 10, the op-shaft 14 of the brake device includes a lever part 30 extending out of the brake device housing (not shown in FIG. 10). A load detection sensor/switch 130 is located on the outer end of the lever part 30, i.e. at the load input end, at the actuation interface with the load actuator, for example the piston of an air cylinder. The sensor 130 is adapted to measure the applied load and, through a cable connection loom 132, provides a signal to the ECU that is used to assess load and running clearances. This signal can be a proportional signal. It can also be a Hi/Low signal dependent upon whether the measured load is above/below a predetermined load level. The use of a switch/sensor 130 on the extended end of the op-shaft reduces the level of lost motion that is introduced into the system. The large velocity ratio between the actuator input end and op-shaft movement at the brake end is typically 20–1.

Figure 8:
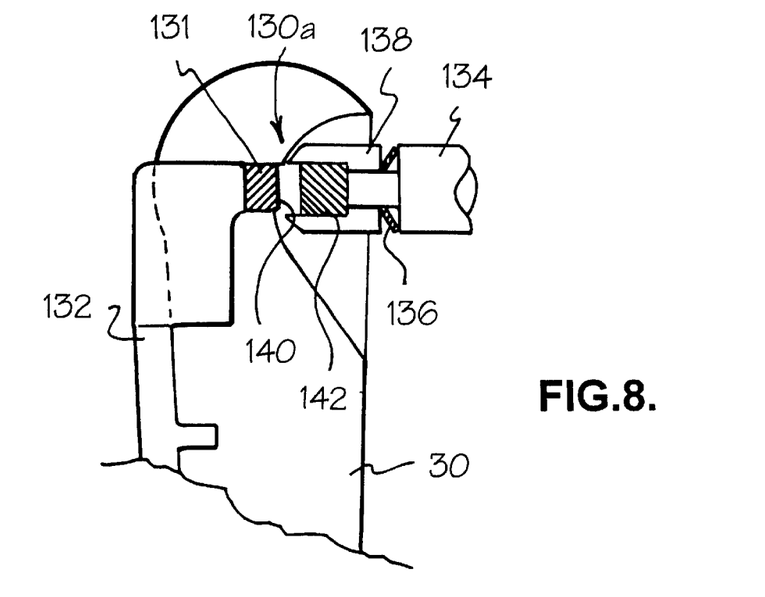
FIGS. 8 and 9 illustrate first and second embodiments of load detection arrangement for use in connection with the present invention.
Figure 9:
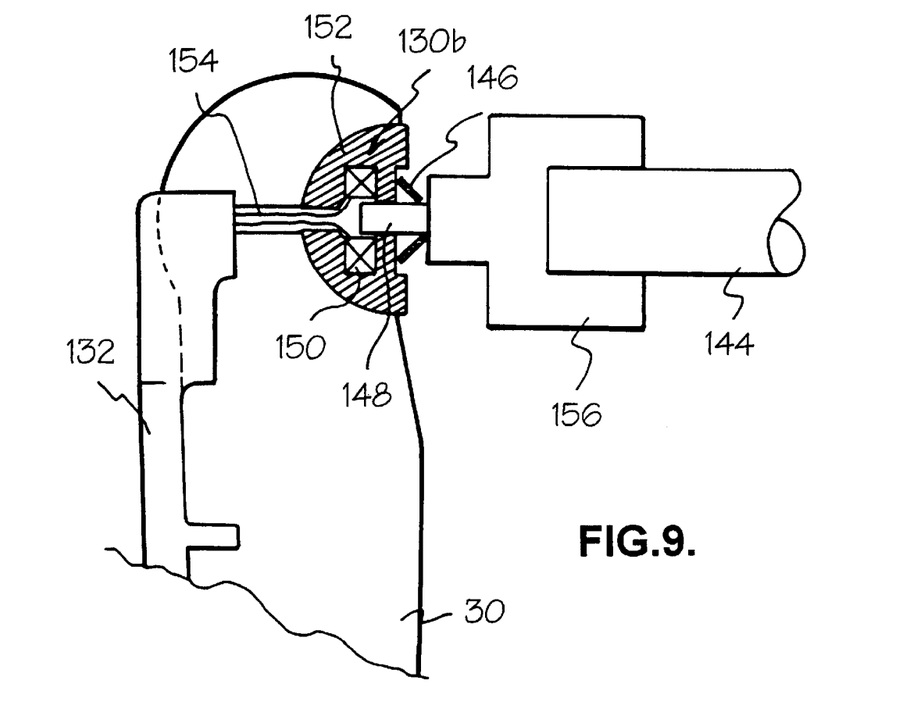

Two different types of switch/sensor 130 are shown, by way of example, in FIGS. 8 and 9.

The sensor 130a of FIG. 8 is in the form of a Hall effect sensor to detect the load condition. The load applied by an actuation rod 134 (for example from an air cylinder) reacts against a Belleville washer 136 which is sandwiched between the input rod 134 and a collar 138 acting against an arcuate surface 140 of the extended portion of the op-shaft lever part 30. The collar 138 also locates a magnet portion 142 of the sensor, a detector part of the sensor being located within the lever part 30, adjacent the arcuate surface 140. The detector part is coupled to wiring of the loom 132. The Belleville washer 136 enables a small movement of the magnet relative to the detector dependent on load which can be detected by the Hall effect to provide a proportional signal representative of load level. Either within or in the vicinity of the sensor 130, or at another convenient location, such as in the ECU, there can be included a level detector to provide the Hi/Low signal dependent on whether the measured load level is above/below said predetermined level.

The sensor 130b of FIG. 9 is in the form of a linear displacement sensor for proportional load measurement. An actuation rod 144 reacts against a Belleville washer 146 to provide proportional load movement of an axially extending soft iron finger 148. The finger 148 extends into a coil 150 to detect linear displacement. Both the Belleville washer 146 and coil 150 are positioned in a spherical knuckle 152 to allow sliding movement between the knuckle 152 and op-arm portion 30 during the actuation movement. Leads 154 from the coil 150 exit through a hole to the rear of the op-arm and connect to a loom 132 directed to the ECU.

In both the FIG. 8 and FIG. 9 arrangements, the actuation rod 134, 144 can be attached directly to the sensor or, as shown in FIG. 9, via an attachment 156 secured to the actuation rod.

Figures 11, 12:
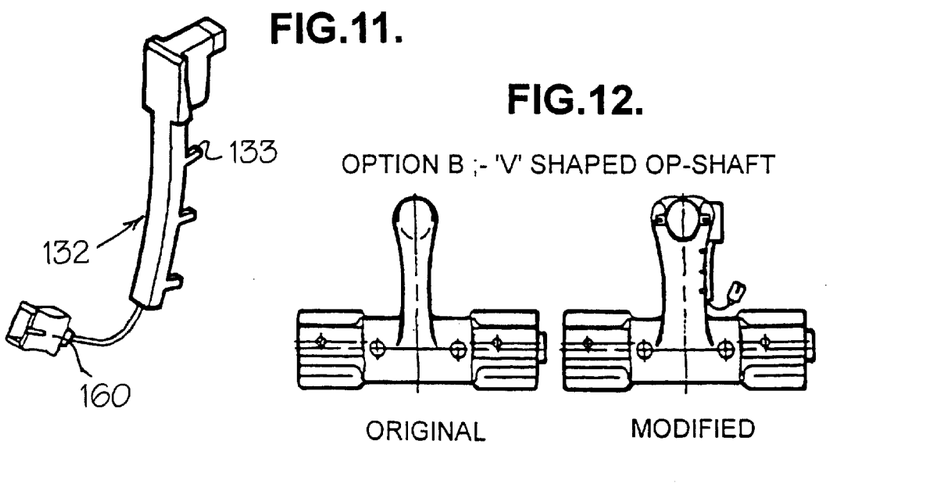
FIG. 11 shows in more detail the embodiment of wiring loom assembly shown in FIG. 10.
FIG. 12 illustrates two different operating shaft structures.

FIG. 11 shows a wiring loom arrangement 132 consisting of a moulded plastic connection which clips on to the op-arm by way of extending arms which conveniently lock into associated recesses on the arm or grip over appropriately located ridges. The loom has a connector 160 that can be connected direct to the ECU or to a suitable local connection associated with the ECU.

FIG. 14 shows two possible op-shaft configurations, the lefthand version of which is conventional and the right-hand version, filled with the wiring loom arrangement, is "v"-shaped.

Figure 4:
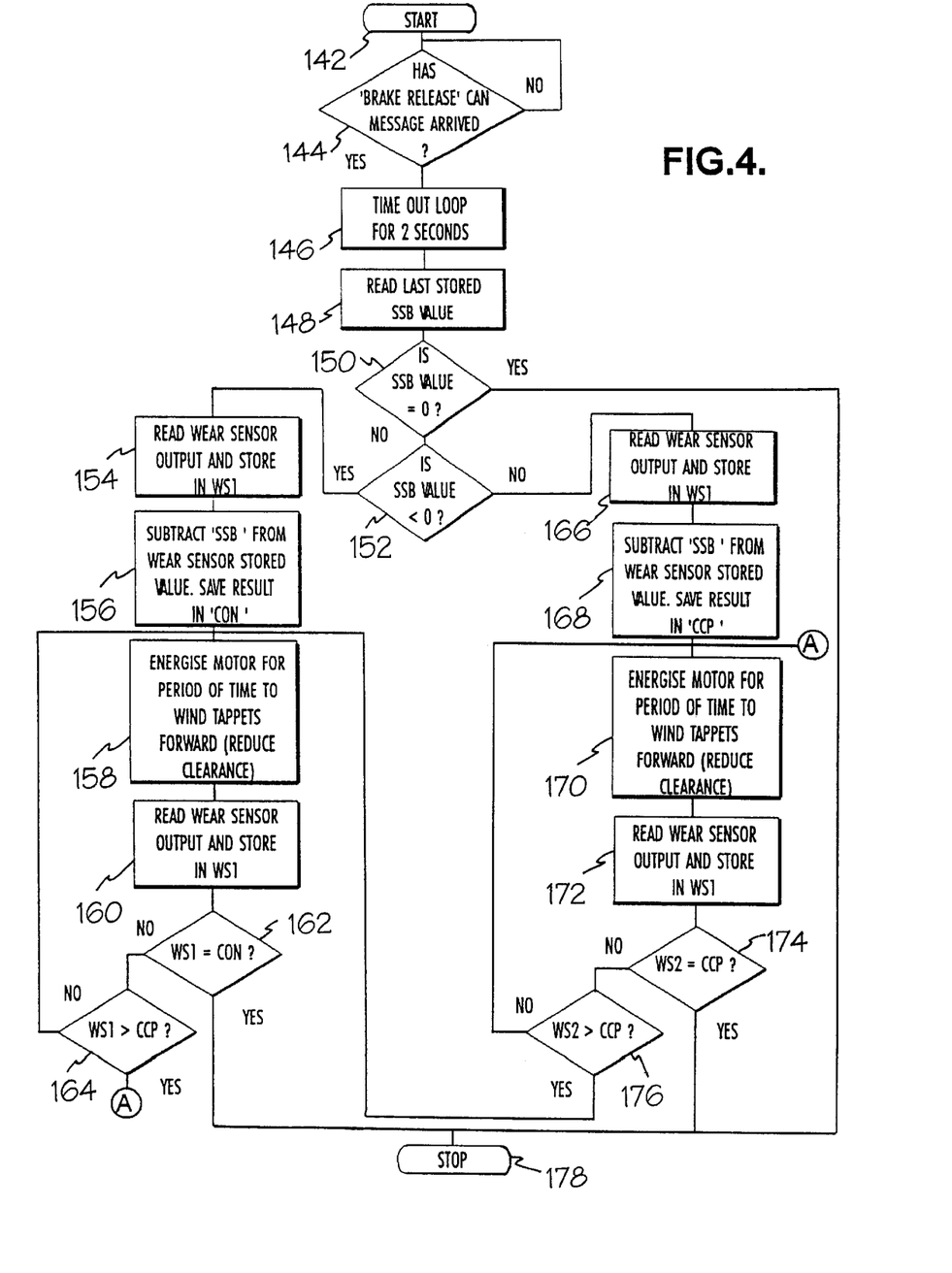
FIG. 4 is a flowchart showing the clearance adjustment sequence.

The actual stroke or displacement of the brake is recorded and checked to see if it has (a) changed any prescribed amount from an earlier application or (b) changed by any amount that exceeds a prescribed clearance threshold. Upon release of the brake, the preceding routine is repeated as the brake load is released (See FIG. 3b). The results for the actual clearance measured are stored and if outside prescribed thresholds the brake is then adjusted in accordance with the procedure outlined in the flowchart of FIG. 4, the individual steps of which are as follows:

142—Start
144—Has "brake release" CAN message arrived?
146—Time out loop for 1 seconds
148—Read last stored SSB value
150—Is SSB value=0?
152—Is SSB value<0?
154—Read wear sensor output and store in "WSI"
156—Subtract "SSB" from rear sensor stored value. Save result in "CON"
158—Energise motor for period of time to wind tappets forward (reduce clearance)
160—Read wear sensor output and store in "WSI"
162—WSI=CON?
164—WSI>CON?
166—Read wear sensor output and store in "WSI"
168—Subtract "SSB" from wear sensor stored value. Save result in "CCP"
170—Energise motor for period of time to wind tappets back (increase clearance)
172—Read wear sensor output and store in "WSI"
174—WSI=CCP?
176—WSI<CCP?
178—Stop.

Brake adjustment is achieved in accordance with the operation as outlined in FIG. 4. Upon detection that the brake has been released, and detection that the stored clearance value is outside the prescribed adjustment threshold, the motor 40 is energised either to decrease the brake free running clearance or to increase the brake free running clearance by rotation of the tappet member 22 in the appropriate direction. The output from the tappet driven wear-out sensor or encoder 44 is recorded or accumulated to provide a signal indicative of the worn condition of the brake linings.

Should the signal from the wear-out sensor 44 determine that a lining change is required, then an alarm or other indication could then be issued. De-adjustment of the brake or retraction of the brake applying members is then instigated through use of an electrical or electronic switch (not shown) that, once operated, acts in accordance with the principles shown in the flowchart of FIG. 5. Once activated, the system determines whether the vehicle is in a correct condition to allow the brake to be 'opened' i.e. stationary. If this condition is satisfied then the electric motor 40 is energised so as to cause the brake-applying members to retract from the brake rotor 12. As the brake is no longer in correct adjustment, a flag is set so as to indicate to a controller than an adjustment is required.

Figure 6:
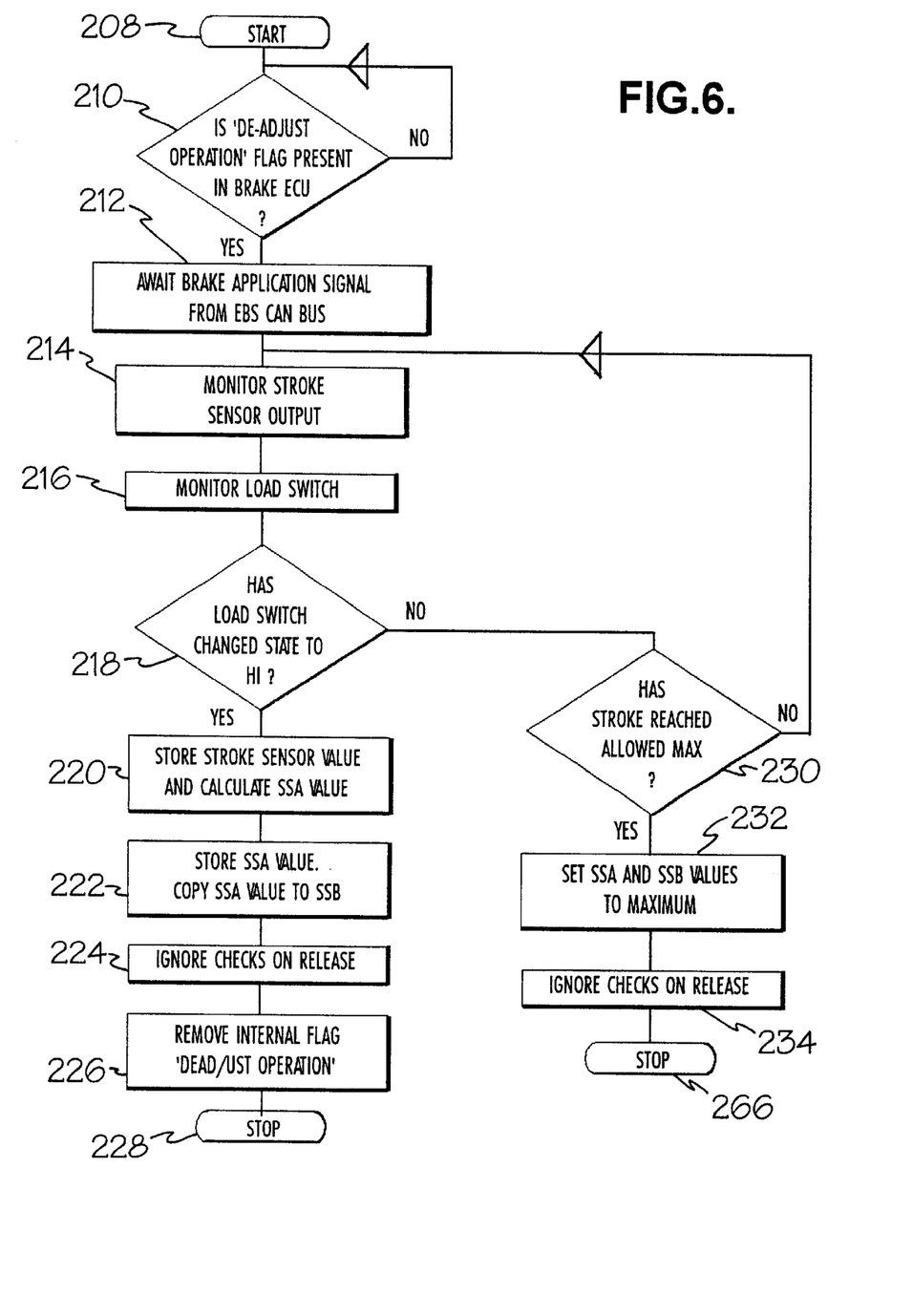
FIG. 6 is a flowchart showing the readjustment of a brake that has been reset.

After re-assembly of the brake, the out-of-adjustment flag is recognised and the brake is rapidly re-adjusted with the operation of flowchart of FIG. 6.

Figure 5:
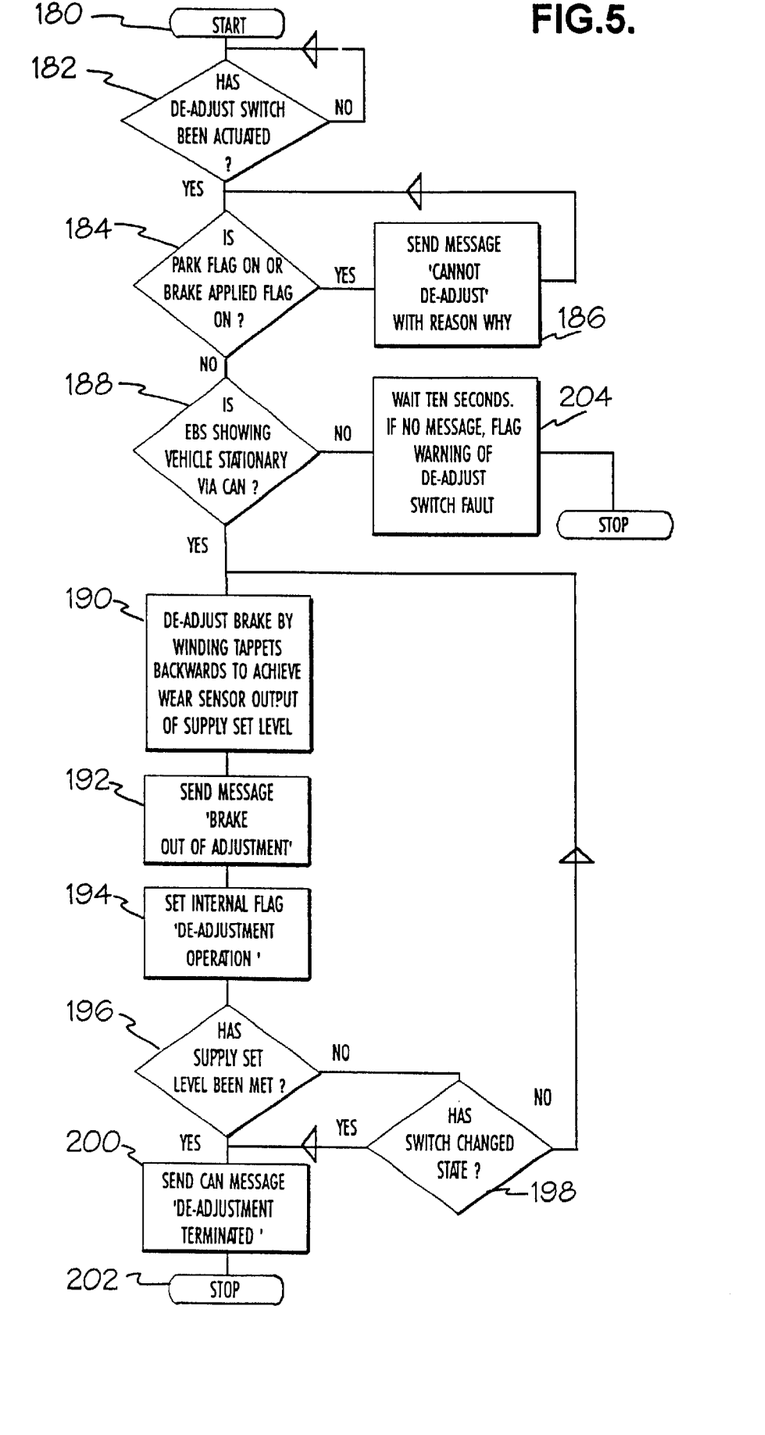
FIG. 5 is a flowchart showing the initiation of de-adjustment.

The individual steps in the flowcharts of FIGS. 5 and 6 are as follows:

180—Start
182—Has de-adjust switch been actuated?
184—Is park flag on or brake applied flag on?
186—Send message "cannot de-adjust" with reason why 188—Is EBS showing vehicle stationary via CAN
190—De-adjust brake by winding tappets backwards to achieve wear sensor output of supply set level
192—Send message "brake out of adjustment"
194—Set internal flag "de-adjustment operations"
196—Has supply set level been met?
198—Has switch changed state?
200—Send CAN message "de-adjustment terminated"
202—Stop
204—Wait 10 seconds. If no message, flag warning of de-adjust switch fault
206—Stop
208—Start
210—Is "de-adjust operation" flag present in brake ECU?
212—Await brake application signal from EBS CAN bus
214—Monitor stroke sensor output
216—Monitor load switch
218—Has load switch changed state to HI?
220—Store stroke sensor value and calculate SSA value
222—Store SSA value, copy SSA value to SSB
224—Ignore checks on release
226—Remove internal flat "de-adjust operation"
228—Stop
230—Has stroke reached allowed max?
232—Set SSA and SSB values to maximum
234—Ignore checks on release
236—Stop.

What is claimed is:

1. A vehicle braking system adapted to apply a brake lining to a brake rotor, and comprising a clearance control device for maintaining the free running clearance between the brake lining and the brake rotor during the non-braking phase, characterised by an electric motor (40) for adjustment of the brake lining position relative to the brake rotor to maintain a predetermined free running clearance in response to brake lining wear, said adjustment being arranged to take place only during the brakes-off condition.

2. A vehicle braking system as claimed in claim 1 wherein the electric motor (40) is housed substantially within a brake housing, whereby to protect it and it's associated drive from any ingress of contaminants.

3. A vehicle braking system as claimed in claim 1, wherein in order to provide adjustment data required to perform an adjustment operation, one or more sensing means are provided to generate information about the movement of the brake.

4. A vehicle braking system as claimed in claim 3, which includes a sensing means for measuring the free-running clearance take-up movement of the brake.

5. A vehicle braking system as claimed in claim 4, wherein said sensing means includes first and second sensing means adapted to determine the displacement of the brake and the load applied by the brake respectively.

6. A vehicle braking system as claimed in claim 5, including a means to compare the outputs of said first and second sensing means so as to determine the free running clearance of the brake.

7. A vehicle braking system as claimed in claim 6, wherein a wiring loom carrying electrical wires from the first and/or second sensing means is attached to a rotary lever (30) for carrying electrical signals from the first and/or second sensing means to a vehicle ECU.

8. A vehicle braking system as claimed in claim 7, wherein the wiring loom comprises a moulded plastics connection which clips onto the lever (30) by way of extending arms (133) which lock into associated recesses (135) on the lever (30) or grip over appropriately located ridges.

9. A vehicle braking system as claimed in claim 4, wherein the sensing means is also used to provide a signal that indicates the actual wear state of the brake linings and takes the form of an encoder, either linear or rotary, that is driven from a part of the brake that moves upon adjustment of the brake, said encoder signals being accumulated in a non-volatile memory for use in an adjustment operation.

10. A vehicle braking system as claimed in claim 1, wherein brake de-adjustment is adapted to be enabled through use of the same electric motor, operated in reverse mode in response to actuation of a brake-associated switch, either mounted on the brake or electrically connected thereto.

11. A vehicle braking system adapted to apply a brake lining to a brake rotor, and comprising a clearance control device for maintaining the free running clearance between the brake lining and the brake rotor during the non-braking phase, characterised by an electric motor (40) for adjustment of the brake lining position relative to the brake rotor, said adjustment being arranged to take place only during the brakes-off condition wherein the electric motor (40) is housed substantially within a brake housing to protect the electric motor (40) from any ingress of contaminants, and including a rotary lever (14), angular displacement of which by an external actuator causes axial displacement of laterally spaced tappets (22) whereby to transmit the actuator input load to a brake lining (26) of the brake.

12. A vehicle braking system as claimed in claim 11, wherein the electric motor (40) is located in a portion of the brake between the tappets (22).

13. A vehicle braking system as claimed in claim 11, wherein the electric motor (40) is a high-speed, low power/torque motor, operated in combination with a reduction gearbox (42).

14. A vehicle braking system as claimed in claim 13, wherein the reduction gearbox (42) is a compound epicyclical or multi-stage planetary gearbox, or is a worm and wheel or cycloidal gearbox.

15. A vehicle braking system adapted to apply a brake lining to a brake rotor, and comprising
   a clearance control device for maintaining the free running clearance between the brake lining and the brake rotor during the non-braking phase;
   an electric motor (40) for adjustment of the brake lining position relative to the brake rotor, said adjustment being arranged to take place only during the brakes-off condition wherein the electric motor (40) is housed substantially within a brake housing to protect the electric motor (40) from any ingress of contaminants;
   a rotary lever (14), angular displacement of which by an external actuator causes axial displacement of laterally spaced tappets (22) whereby to transmit the actuator input load to a brake lining (26) of the brake;
   one or more sensing means for generating information about the movement of the brake in order to provide adjustment data required to perform an adjustment operation including first and second sensing means adapted to determine the displacement of the brake and the load applied by the brake respectively and a sensing means for measuring the free-running clearance take-up movement of the brake wherein the sensing means for determining the brake load comprises a load detection device (130) disposed at the load input end of the rotary lever (14) where the load is applied thereto by the external actuator.

16. A vehicle braking system as claimed in claim 15, wherein the load detection device (130) is disposed at the actuation interface between the external actuator and the rotary lever (14).

17. A vehicle braking system as claimed in claim 15, wherein the load detection device comprises a Hall effect proximity sensor (130a) having a fixed component (131) disposed in the outer end of the rotary lever (30) and a movable component (142) disposed on an end region of an actuator rod (134), load proportional displacement of the actuator rod (134) relative to the rotary lever (30) being enabled by the provisions of a compressible spring (36) therebetween.

18. A vehicle braking system as claimed in claim 15, wherein the load detection device comprises a linear displacement sensor comprising a coil (150) Axed within the outer end of the rotary lever (30) and a movable part (148) on an end region of an actuator rod (144), load proportional displacement of the actuator rod relative to the coil being enabled by the provision of a compressible spring (146) between the actuator rod (144) and the rotary lever (30).

* * * * *